United States Patent Office 3,445,454
Patented May 20, 1969

3,445,454
MONO AZO DYESTUFFS
Brian Ribbons Fishwick and Andrew Tze-Chiu Liu, Manchester, England, assignors to Imperial Chemical Industries Limited, London, England, a corporation of Great Britain
No Drawing. Filed July 23, 1965, Ser. No. 474,469
Claims priority, application Great Britain Aug. 10, 1964, 32,450/64
Int. Cl. C09b 29/06; D06p 1/08
U.S. Cl. 260—205     3 Claims

ABSTRACT OF THE DISCLOSURE

Water-insoluble azo dyestuffs free from sulphonic acid or carboxylic acid groups having the formula

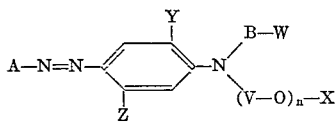

wherein A is the radical of a diazo component of the benzene series; Y is hydrogen, a halogen atoms, a lower alkyl or lower alkoxy group; Z is hydrogen, a halogen atom, lower alkyl, lower alkoxy, trifluoromethyl or acyclamino; B is alkylene; W is cyano, alkoxy, aryloxy, acyloxy, carboalkoxy, or aryloxycarbonyl group or B—W represents a group of the formula—$(V—O—)_n$; V is alkylene; X is hydogen or an acyl group and $n$ is an integer from 2–10.

This invention relates to new azo dyestuffs, and more particularly it relates to new water-insoluble azo dyestuffs which are valuable for colouring synthetic textile materials.

According to the invention there are provided the water-insoluble azo dyestuffs of the formula

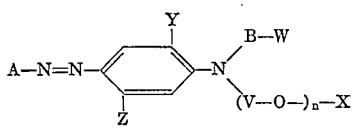

wherein A is the radical of a diazo component of the benzene series;
Y is hydrogen or a halogen atom or a lower alkyl or lower alkoxy group;
Z is a hydrogen or a halogen atom or a lower alkyl, lower alkoxy, trifluoromethyl or acyclamino group;
$n$ is an integer of from 2 to 10;
X is a hydrogen atom or an acyl group;
V is an alkylene radical;
B is an alkylene radical; and
W is a cyano, alkoxy, aryloxy, acyloxy, carboalkoxy, or aryloxycarbonyl group, or —B—W represent a group of the formula —$(V—O—)_n$-acyl; provided that the dyestuffs are free from sulphonic acid or carboxylic acid groups.

As examples of the halogen atoms represented by Y or Z there may be mentioned chlorine or bromine atoms.

Throughout this specification the terms "lower alkyl" and "lower alkoxy" are used to denote alkyl and alkoxy groups respectively containing from 1 to 4 carbon atoms.

As examples of the lower alkyl groups represented by Y or Z there may be mentioned ethyl, propyl, butyl and, preferably, methyl groups; and as examples of the lower alkoxy groups represented by Y or Z there may be mentioned ethoxy, propoxy, butoxy and, preferably, methoxy groups.

As examples of the acyl groups represented by X or which may be present in the —$(V—O—)_n$-acyl groups represented by W there may be mentioned acyl groups derived from aliphatic carboxylic acids in particular lower aliphatic carboxylic acids such as formic acid, acetic acid, propionic acid and butyric acid and substituted lower aliphatic carboxylic acids such as chloracetic acid, methoxyacetic acid and β-acetoxypropionic acid; acyl groups derived from aliphatic sulphonic acids in particular lower alkane sulphonic acids such as methane sulphonic acid and ethane sulphonic acid; acyl groups derived from monocyclic aromatic carboxylic acids such as benzoic acid, methoxybenzoic acids and toluic acids; acyl groups derived from monocyclic aromatic sulphonic acids such as benzene sulphonic acid and toluene sulphonic acids; and acyl groups derived from lower aliphatic or monocyclic aromatic carbonic or carbamic acids such as methoxycarbonyl, phenoxycarbonyl, aminocarbonyl, methylaminocarbonyl or phenylaminocarbonyl groups. It is however preferred that the acyl groups are acyl groups of the formula—COX' wherein X' is a hydrogen atom or a lower alkyl group.

The acylamino groups represented by Z are preferably acylamino groups of the formula:

wherein R is a hydrogen atom or a alkyl group, and X" is an acyl group which can be the same as the acyl group represented by X. It is preferred that the acylamino group represented by Z is an acylamino group of the formula:

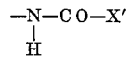

wherein X' has the meaning stated.

The alkylene radicals represented by B and V are preferably lower alkylene radicals, that is to say alkylene radicals containing from 1 to 4 carbon atoms; and as examples of such alkylene radicals there may be mentioned methylene, propylene, trimethylene, tetramethylene and, above all, ethylene radicals. In the case of the alkylene radicals represented by V in the groups of the formula —$(V—O—)_n$-X it is not necessary that each radical represented by V has the same value; thus, for example, when $n$ represents 2 one V can be the ethylene radical and the other V the trimethylene radical.

The alkoxy groups represented by W are preferably lower alkoxy groups such as methoxy, ethoxy, propoxy and butoxy groups, which if desired may contain substituents such as acyloxy groups, so that W can also represent groups such as the β-acetoxyethoxy group. The aryloxy groups represented by W are preferably monocyclic aryloxy groups such as phenoxy or tolyloxy groups which may contain substituents such as chlorine atoms or nitro, or lower alkoxy groups. The aryloxycarbonyl groups represented by W are preferably monocyclic aryloxycarbonyl groups such as phenoxycarbonyl or tolyloxycarbonyl groups which may contain substituents such as chlorine atoms or nitro or lower alkoxy groups. The carboalkoxy groups represented by W are preferably carbo lower alkoxy groups such as carbomethoxy, carboethoxy, carbopropoxy and carbobutoxy groups. The acyloxy groups represented by W are preferably acyloxy groups of the formula —OX wherein the acyl group represented by X has the meaning given above, and, above all, the acyloxy group represented by W is a group of the formula: —O.COX′ wherein X′ has the meaning stated above. It is however preferred that W represents the cyano group or a carbo lower alkoxy group.

The radical of a diazo component of the benzene series represented by A is preferably a phenyl radical which is optionally substituted by one or more halogen atoms such as chlorine or bromine atoms, or nitro, cyano, trifluoromethyl, lower alkyl sulponyl such as methylsulphonyl or ethylsulphonyl, lower alkyl carbonyl such as acetyl or propionyl, carbo lower alkoxy such as carbomethoxy, carboethoxy, or carbopropoxy, or azo such as substituted or unsubstituted phenylazo or naphthylazo groups.

As specific examples of the groups represented by —B—W there may be mentioned β-cyanoethyl, ethoxymethyl, β-methoxyethyl, β-ethoxyethyl, β-phenoxyethyl, β-formyloxyethyl, β-acetoxyethyl, γ-acetoxypropyl, β-propionyloxyethyl, β-carbomethoxyethyl, β-carboethoxyethyl, β-phenoxycarbonyl, β-(p-chlorophenoxy)ethyl, β-(o-methoxyphenoxy)ethyl, β-benzoloxypropyl, β-(β′-propionyloxyethoxy)ethyl, β-(β′-acetoxyethoxy)ethyl, β[-β′-(β″-acetoxyethoxy)ethoxy]ethyl and β-(β′-formyloxyethoxy)ethyl.

As specific examples of the groups represented by —(C₂H₄—O—)ₙ—X there may be mentioned β-(β′-hydroxyethoxy)ethyl,
β-[β′-(β″-hydroxyethoxy)ethoxy]ethyl,
β-{β′-[β″-(β‴-hydroxyethoxy)ethoxy]ethoxy}ethyl,
β-(β′-acetoxyethoxy)ethyl,
β-(β′-propionyloxyethoxy)ethyl,
β-(β′-formyloxyethoxy)ethyl,
β-[β′-(β″-acetoxyethoxy)ethoxy]ethyl,
β-{β′-[β″-(β‴-acetoxyethoxy)ethoxy]ethoxy}ethyl,
β-[β′-(p-nitrobenzoyloxy)ethoxy]ethyl,
β-(β′-methylsulphonylethoxy)ethyl,
β-(β′-methoxycarbonyloxyethoxy)ethyl and
β-(β′-methylaminocarbonyloxyethoxy)ethyl.

According to a further feature of the invention there is provided a process for the manufacture of the water-insoluble azo dyestuffs, as hereinbefore defined, which comprises coupling a diazotised primary amine of the benzene series with a coupling component of the formula:

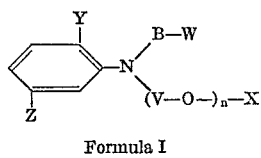

Formula I wherein B, V, W, n, X, Y and Z have the meanings stated above provided that the amine and coupling component are free from sulphonic acid and carboxylic acid groups.

The process of the invention may be conveniently brought about by adding an aqueous solution or suspension of the diazotised primary amine to a solution of the coupling component in a dilute aqueous solution of an acid such as hydrochloric acid, stirring the resulting mixture, preferably at a pH between 3 and 7, to effect formation of the azo dyestuff, and finally isolating the azo dyestuff by conventional methods.

As specific examples of primary amines of the benzene series there may be mentioned aniline, o-, m- or p-toluidine,
o-, m- or p-anisidine,
o-, m- or p-chloroaniline,
o-, m- or p-bromoaniline,
o-, m- or p-nitroaniline,
2:5-dichloroaniline,
2:4-dinitroaniline,
2:4-dinitro-6-(chloro or bromo)aniline,
4-methanesulphonylaniline,
4-aminobenzotrifluoride,
4- or 5-nitro-2-toluidine,
4- or 5-nitro-2-anisidine,
4- or 5-chloro-2-anisidine,
4- or 5-chloro-2-toluidine,
4- or 5-bromo-2-anisidine,
2:6-di(chloro- or bromo)-4-nitroaniline,
2:4:6-trinitroaniline,
2:4-dinitro-6-carbomethoxyaniline,
2-amino-5-nitrobenzotrifluoride,
2:4-bis(methanesulphonyl)aniline,
2-(chloro- or bromo-)-4-nitoraniline,
methylanthranilate,
4- or 5-nitromethylanthranilate,
4-aminobenzamide,
2:6-di(chloro- or bromo-)aniline-4-sulphonamide,
2:6-di(chloro- or bromo-)-4-methylsulphonylaniline,
2:5-di(chloro- or bromo-)-4:6-dinitroaniline,
2-amino-3:5-dinitrobenzotrifluoride,
3-amino-2-(chloro- or bromo-)-4:6-dinitro-(toluene or anisole),
3-amino-2-(chloro- or bromo-)-2:6-dinitro-(toluene or anisole),
3-amino-2:4:6-trinitrotoluene,
2-(chloro- or bromo-)-4-methylsulphonylaniline,
2-(chloro- or bromo-)-4-triocyanatoaniline,
2-(chloro- or bromo-)-4-sulphamylaniline,
2-amino-5-nitrophenylmethylsulphone,
2-amino-3:5-dinitrophenylmethylsulphone,
2-amino-3-(chloro- or bromo-)-5-nitrophenylmethylsulphone,
2-sulphamyl-4-nitroaniline,
2-methylsulphamyl-4-nitroaniline,
2-ethylsulphamyl-4-nitroaniline,
2-butylsulphamyl-4-nitroaniline,
2-dimethylsulphamyl-4-nitroaniline,
2-methylsulphamyl-4:6-dinitroaniline,
2-methylsulphamyl-4-nitro-6-(cholor- or bromo)aniline,
2-phenylsulphamyl-4-nitroaniline,
methyl 2-amino-3-(chloro- or bromo-)-5-nitrobenzoate,
methyl 2-amino-3:5-dinitrobenzoate,
dimethyl 2-aminoterephthalate,
dimethyl 2-amino-5-nitroterephthalate,
4-aminoazobenzene and
2-4′-aminophenylazo)naphthalene.

Preferably the primary amine of the benzene series is an amine of the formula:

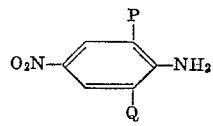

wherein P is hydrogen, chlorine, bromine, cyano, nitro, lower alkyl sulphonyl, lower alkoxy or carbo lower alkoxy, and Q is hydrogen chlorine or bromine.

The coupling components of Formula I wherein X represents a hydrogen atom may themselves be obtained by reacting the corresponding secondary amine of the formula:

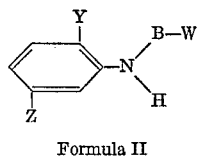

Formula II wherein $n$ and V have the meanings stated or by hydrolysis with the required molecular proportions of an alkylene oxide such as ethylene oxide, or with a chloro- or bromo-alkanol of the formula: Cl—(V—O—)$_n$—H or Br—(V—O—)$_n$—H wherein $n$ and V have the meanings stated or by hydrolysis of the corresponding compounds wherein X is an acyl radical.

The coupling components of Formula I wherein X represents an acyl group may themselves be obtained by acylating the corresponding coupling component of Formula I wherein X represents a hydrogen atom, or by treating the corresponding secondary amine of Formula II with an acylated chloro- or bromoalkanol of the formula: Cl—(V—O—)$_n$—acyl or Br—(V—O—)$_n$—acyl wherein $n$ and V have the meanings stated. Alternatively the coupling components of Formula I wherein X represents an acyl group may be obtained by reacting the corresponding primary amine with one molecular proportion of the said acylated chloro- or bromo-alkanol and introducing the required —B—W group into the resulting secondary amine by conventional methods for the introduction of such groups.

As specific examples of the coupling components of Formula I there may be mentioned N-(β-cyanoethyl)-N-}β-[β′-(β″-hydroxyethoxy)-ethoxy] ethyl{-m-toluidine,
N-(β-cyanoethyl)-N-}β-[β′(β″-hydroxyethoxy) ethoxy]ethyl{-m-chloroaniline,
N-(β-cyanoethyl)-N-[β-(β-hydroxyethoxy)ethyl]aniline,
3-}N-(β-cyanoethyl)-N-[β-(β′-hydroxyethoxy)ethyl] amino{acetanilide,
N-(β-cyanoethyl)-N-[β-(β′-acetoxyethoxy)ethyl] aniline,
N-(β-cyanoethyl)-N-}β-[β′-(β″-acetoxyethoxy)-ethoxy] ethyl{aniline,
N-(β-cyanoethyl)-N-(β-}β′-[β″-(β‴-acetoxyethoxy) ethoxy]ethoxy{ethyl)aniline,
N-(β-cyanoethyl-N-[β-(β′-acetoxyethoxy)ethyl]-m-bromoaniline,
N-(β-methoxycarbonyl)-N-[β-(β′-acetoxyethyl)ethyl] aniline,
N-(β-methoxyethyl)-N-[β-(β′-hydroxyethoxy)-ethyl] aniline,
N-(β-phenoxyethyl)-N-[β-(β′-hydroxyethoxy)ethyl] aniline ,
N-ethoxycarbonylmethyl-N-[β-(β′-hydroxyethoxy)ethyl] aniline,
N-(β-methoxycarbonylethyl)-N-[β-(β′-hydroxyethoxy) ethyl]aniline,
N-(β-phenoxycarbonylethyl)-N-[β-(β′-hydroxyethoxy) ethyl]aniline,
N-(β-acetoxypentyl)-N-[β-(β′-acetoxyethoxy)ethyl] aniline,
N-(β-acetoxyethyl)-N-[β-(β′-hydroxyethoxy)ethyl] aniline,
2-methoxy-5-acetamido-N-(β-acetoxyethyl)-N-[β-(β′-acetoxyethyl)ethyl]aniline,
2-ethoxy-5-acetamido-N-(β-acetoxyethyl)-N-}β′-(β″-acetoxyethoxy)ethoxy]ethyl{aniline,
N-(β-acetoxyethyl)-N-[β-(β′-acetoxyethoxy)ethyl]-2-methoxy-5-methylaniline,
N:N-bis-[β-(β′-propionyloxyethoxy)ethyl]-m-aminoacetanilide,
2-methoxy-5-acetamido-N:N-bis-[β-(β′-acetoxyethoxy) ethyl]aniline,
2-methyl-5-acetamido-N:N-bis-[β-(β′-acetoxyethoxy) ethyl]aniline,
2:5-dimethoxy-N:N-bis-[β-(β′-acetoxyethoxy)ethyl] aniline and
N-(β-cyanoethyl)-N-[β-(β′-hydroxyethoxy)ethyl]-m-trifluoromethylaniline.

One preferred class of the water-insoluble azo dyestuffs of the invention comprises the dyestuffs which are represented by the formula:

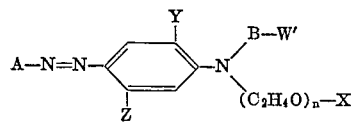

wherein A, B, Z, Y, X and $n$ have the meanings stated W′ represents a —CN, —O—aryl or carbo lower alkoxy group.

It is further preferred that $n$ represents an integer of from 2 to 4, preferably 2.

A second preferred class of the water-insoluble azo dyestuffs of the invention comprises the dyestuffs which are represented by the formula:

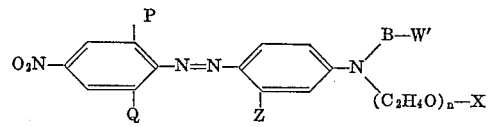

wherein B, Y, Z, W′, X and $n$ have the meanings stated above, P represents hydrogen, chlorine, bromine, cyano, nitro, lower alkyl sulphonyl, lower alkoxy or carbo lower alkoxy, and Q represents hydrogen, chlorine or bromine.

In this class $n$ preferably represents an integer of from 2 to 4 and above all 2.

In the above classes it is further preferred that X represents an acyl radical, in which case —B—W′ can also represent a —(C$_2$H$_4$O)$_n$-acyl radical.

A third preferred class of the water-insoluble azo dyestuffs if the invention comprises the dyestuffs which are represented by the formula:

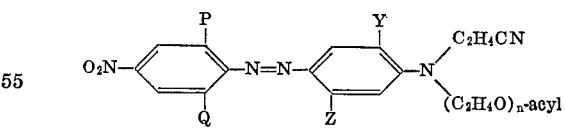

wherein P, Q, Y and Z have the meanings stated, and $m$ represents an integer of from 2 to 4.

The azo dyestuffs, as hereinbefore defined, are valuable for colouring synthetic textile materials, for example cellulose acetate textile materials such as secondary cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of loose fibre, thread, yarn, or woven or knitted fabric. The synthetic textile materials may also be in the form of blends with other textile fibres, for example polyester/cotton unions or polyester/wool unions.

Such textile materials can conveniently be coloured with the azo dyestuffs, as hereinbefore defined, by immersing the textile material in a dyebath comprising an aqueous dispersion of one or more of the said dyestuffs, which dyebath preferably contains a nonionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile materials it is preferred to carry out the dyeing process at 95° to 100° C.; in the case of aromatic polyester textile materials the dyeing process can either be carried out at a temperature between 90° and 100° C., preferably in the presence of a carrier, for example diphenyl or o-hydroxydiphenyl, or at a temperature above 100° C., preferably at a temperature between 120° and 140° C., under superatmospheric pressure.

Alternatively the aqueous dispersion of the said azo dyestuff can be applied to the textile material by a padding or printing process, followed by heating or steaming of the textile material. In such processes it is preferred to incorporate a thickening agent, such as gum tragacanth, gum arabic or sodium alginate, into the aqueous dispersion of the said azo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The dyestuffs have excellent affinity and build-up properties on synthetic textile materials, and in particular on aromatic polyester textile materials, so enabling deep shades to be obtained. The resulting colorations, which range in shade from yellow to blue, have excellent fastness to light, to wet treatments and, in particular, to dry heat treatments such as those carried out at high temperatures during pleating operations. The dyestuffs have also excellent affinity for cellulose acetate textile materials.

If desired the dyestuffs of the invention can be applied to synthetic textile materials in conjunction with other disperse dyes, such as are described in, for example, British specifications Nos. 806,271, 835,819, 840,903, 847,175, 852,396, 852,493, 859,899, 865,328, 872,204, 894,012, 908,656, 909,843, 910,306, 913,856, 919,424, 944,513, 944,722, 953,887, 959,816, 960,235 and 961,412.

The invention is illustrated but not limited by the following examples in which the parts are by weight.

Example 1

A solution of 2.76 parts of 4-nitroaniline in a mixture of 27 parts of acetic acid and 10 parts of a concentrated aqueous solution of hydrochloric acid is cooled to 5° C., a solution of 1.38 parts of sodium nitrite in 10 parts of water is added with stirring, and the mixture stirred for 15 minutes. The diazo solution so obtained is added to a solution of 4.8 parts of N-(β-cyanoethyl)-N-[β-(β'-hydroxyethoxy)ethyl]aniline in a mixture of 100 parts of acetone and 110 parts of a 0.2 N aqueous solution of hydrochloric acid at 5° C., and the mixture is stirred for minutes. A solution of 10 parts of sodium acetate in 50 parts of water is then added and the mixture is stirred for 18 hours at 20° C. The precipitated dyestuff is then filtered off, washed with water and dried.

When dispersed in aqueous medium the dyestuff dyes polyethylene terephthalate textile materials in deep reddish-orange shades having excellent fastness to dry heat treatments.

The N - (β-cyanoethyl)-N-[β-(β'-hydroxyethoxy)ethyl] aniline used in the above example was obtained by reacting N-(β-cyanoethylaniline with two molecular proportions of ethylene oxide at 170° C. The resulting product distilled between 192° and 196° C. at a pressure of 0.125 mm. of mercury.

Example 2

1.63 parts of 2-amino-5-nitrobenzonitrile are added to a solution of nitrosyl sulphuric acid, which is prepared by dissolving 0.7 part of sodium nitrite in 15 parts of sulphuric acid, and the resulting mixture is stirred for 2 hours at 20° to 25° C. The mixture is then slowly added to a solution of 2.92 parts of N-(β-cyanoethyl)-N-{β-[β'-(β''-hydroxyethoxy)ethoxy]ethyl}-m-toluidine in a mixture of 50 parts of acetone and 100 parts of 0.2 N aqueous solution of hydrochloric acid, ice being added to maintain the temperature between 5° and 10° C. Sodium acetate is then added until the mixture is no longer acid to Congo red paper. The mixture is stirred for 2 hours at 5° to 10° C. and the precipitated dyestuff is then filtered off, washed with water and dried.

When dispersed in aqueous medium the dyestuff dyes polyester textile materials in rubine shades possessing excellent fastness to dry heat treatments.

The N-(β-cyanoethyl)-N-{β-[β'-(β'' - hydroxyethoxy) ethoxy]-ethyl}-m-toluidine used in the above example was obtained by reacting N-(β-cyanoethyl)-m-toluidine with 3 molecular proportions of ethylene oxide at 150° C. The resulting product distilled between 190° C. and 195° C. at a pressure of 0.1 mm. of mercury.

Example 3

2.01 parts of 4-aminoazobenzene are added during 30 minutes to a solution of nitrosyl sulphuric acid, which is prepared by dissolving 0.7 part of sodium nitrite in 4 parts of sulphuric acid, and the resulting mixture is stirred for 30 minutes at 20° to 25° C. The mixture is then cooled to 5° C., 30 parts of phosphoric acid of specific gravity 1.65 are added, and the mixture is stirred for 2 hours at 0° to 10° C. The mixture is then poured into 250 parts of ice and filtered. The aqueous filtrate containing the diazonium compound is then added to a solution of 3.12 parts of N-(β-cyanoethyl)-N-{β-[β'-(β''-hydroxyethoxy)ethoxy]ethyl}-m-chloroaniline in a mixture of 100 parts of acetone and 60 parts of a 0.2 N aqueous solution of hydrochloric acid at 5° C. The mixture is stirred for 2 hours at 5° to 10° C., sodium acetate is added until the mixture is no longer acid to Congo Red, and the mixture is stirred for a further 18 hours. The precipitated dyestuff is then filtered off, washed with water and dried.

When dispersed in aqueous medium the dyestuff dyes polyester textile materials in reddish-orange shades possessing excellent fastness to dry heat treatments.

The N-(β-cyanoethyl)-N-{β[β'-(β'' - hydroxyethoxy) ethoxy]-ethyl}-m-chloroaniline used in the above example was obtained by reacting n - (β - cyanoethyl) - m-chloroaniline with 3 molecular proportions of ethylene oxide at 170° C. The resulting product distilled at 200° C. at a pressure of 0.6 mm. of mercury.

The following table gives further examples of the azo dyestuffs of the invention which are obtained by diazotising the amines listed in the second column of the table and coupling the resulting diazo components with the coupling components listed in the fourth column of the table using methods similar to those described in Examples 1 to 3 above. The fourth column of the table indicates the shades obtained when the dyestuffs are applied to polyethylene terephthalate textile materials.

| Example | Amine | Coupling component | Shade |
|---|---|---|---|
| 4 | 2-nitro-4-cyano-6-bromoaniline | N-(β-cyanoethyl)-N-(β-[β-(β''-hydroxyethoxy)-ethoxy]-ethyl)-m-toluidine. | Red. |
| 5 | 2-nitro-4-cyanoaniline | do | Scarlet. |
| 6 | 2-chloro-6-bromo-4-nitroaniline | do | Orange-brown. |
| 7 | 2-cyano-4-nitro-6-bromoaniline | do | Violet. |
| 8 | 4-chloro-2-nitroaniline | do | Reddish-orange. |
| 9 | 4-aminoazobenzene | do | Scarlet. |
| 10 | do | 3-(N-β-cyanoethyl)-N-[β-(β'-hydroxyethoxy)ethyl]-amino)acetanilide. | Red. |
| 11 | 2-cyano-4-nitro-6-bromoaniline | do | Violet. |
| 12 | 4-nitro-2-cyanoaniline | N-(β-cyanoethyl)-N-(β-[β'-(β''-hydroxyethoxy)ethoxy]ethyl)-m-chloroaniline. | Red. |
| 13 | 2-nitro-4-cyanoaniline | do | Reddish-orange. |
| 14 | 2-cyano-4-nitro-6-bromoaniline | do | Rubine. |
| 15 | p-nitroaniline | do | Orange. |
| 16 | 4-chloro-2-nitroaniline | do | Do. |
| 17 | 2-cyano-4-nitro-6-bromoaniline | N-(β-cyanoethyl)-N-[β-(β'-hydroxyethoxy)ethyl]aniline. | Rubine. |
| 18 | 2-chloro-4-nitroaniline | N-(β-cyanoethyl)-N-[β-(β'-acetoxyethoxy)ethyl]aniline. | Scarlet. |
| 19 | 2=6-dichloro-4-nitroaniline | do | Yellowish-brown. |
| 20 | 2-amino-5-nitrobenzonitrile | do | Bluish-red. |
| 21 | p-nitroaniline | N-(β-cyanoethyl)-N-(β-[γ'-(β''-acetoxyethoxy)propoxy]-ethyl)aniline. | Reddish-orange. |
| 22 | do | N-(β-cyanoethyl)-N-[(β-acetoxyethoxy)methyl]aniline. | Do. |
| 23 | 4-nitro-2-trifluoromethylaniline | N-(β-cyanoethyl)-N-[β-(β'-acetoxyethoxy)ethyl]aniline. | Scarlet. |
| 24 | 4-nitro-2-methylsulphonylaniline | do | Red. |
| 25 | 4-nitro-2-methoxycarbonylaniline | do | Scarlet. |
| 26 | 2=6-dichloro-4-sulphamylaniline | do | Orange. |
| 27 | 2-chloro-4-nitroaniline | N-(β-cyanoethyl)-N-[γ-(γ'-acetoxypropoxy)propyl]-3-bromoaniline. | Do. |
| 28 | do | N-(γ-methoxypropyl)-N-[β-(β'-acetoxyethoxy)ethyl]-3-trifluoromethylaniline. | Scarlet. |
| 29 | 2-chloro-4-nitroaniline | N-(β-ethoxyethyl)-N-[β-(β'-acetoxyethoxy)ethyl]-3-ethylaniline. | Bluish-red. |
| 30 | do | N-(β-carbomethoxyethyl)-N-[β-(β'-acetoxyethoxy)ethyl]-m-anisidine. | Yellowish-red. |
| 31 | do | N-(β-phenoxyethyl)-N-[β-(β'-(β''-hydroxyethoxy)ethoxy)ethyl m-toluidine. | Rubine. |
| 32 | do | N-(β-carboethoxypropyl)-N-[β-(β'-acetoxyethoxy)-ethyl]aniline. | Yellowish-red. |
| 33 | do | N-(β-acetoxyethyl)-N-[β-(β'-acetoxyethoxy)ethyl]-aniline. | Do. |
| 34 | do | N-[β-(o-methoxyphenoxy)ethyl]-N-[β-(β'-acetoxyethoxy)ethyl]-aniline. | Red. |
| 35 | do | N-(β-cyanoethyl)-N-(β-[β'-(β''-acetoxyethoxy)ethoxy]-ethyl)aniline. | Scarlet. |
| 36 | do | N-(β-carbophenoxyethyl)-N-[β-(β'-acetoxyethoxy)ethyl]-aniline. | Yellowish-red. |
| 37 | do | N-[β-(cyanomethoxycarbonyl)ethyl-N-[β-(β'-acetoxyethoxy)ethyl]aniline. | Scarlet. |
| 38 | do | N-[β-(β'-hydroxyethoxycarbonyl)-ethyl]-N-[β-(β'-hydroxyethoxy)-ethyl]aniline. | Red. |
| 39 | 2-chloro-4-nitroaniline | N-[β-(β'-methoxyethoxycarbonylethyl]-N-[β-(β'-acetoxyethoxy)-ethyl]aniline. | Yellowish-red. |
| 40 | do | N-[β-phenoxycarbonylethyl]-N-[β-(β'-acetoxyethoxy)-ethyl]aniline. | Do. |
| 41 | do | N-[β-(N'-phenylcarbamoyl)ethyl]-N-[β-(β'-acetoxyethoxy)ethyl]aniline. | Do. |
| 42 | do | N-[β-(methoxycarbonyloxy)ethyl]-N-[β-(β'-acetoxyethoxy)ethyl]aniline. | Do. |
| 43 | do | N-(β-phenoxyethyl)-N-[β-(β'-acetoxyethoxy)ethyl]aniline. | Bluish-red. |
| 44 | 2-cyano-4-nitroaniline | N-(β-cyanoethyl)-N-[β-(β'-propionyloxyethoxy)ethyl]-aniline. | Do. |
| 45 | do | N-(β-cyanoethyl)-N-[β-(β'-methanesulphonyloxyethoxy)-ethyl]aniline. | Red. |
| 46 | do | N-(β-cyanoethyl)-N-[β-(β'-benzoyloxyethoxy)ethyl]aniline. | Bluish-red. |
| 47 | do | N-(β-cyanoethyl)-N-[β-(β'-p-toluoyloxyethoxy)ethyl]-aniline. | Do. |
| 48 | do | N-(β-cyanoethyl)-N-[β-(β'-(m-methoxybenzoyloxy)ethoxyethyl]-aniline. | Do. |
| 49 | do | N-(β-cyanoethyl)-N-[β-(β'-(N'-phenylcarbamoyl)ethoxy)ethyl]aniline. | Do. |

The following table gives further examples of the water-insoluble azo dyestuffs of the formula:

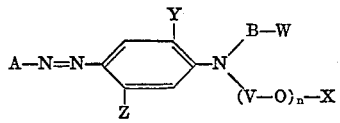

the symbols of which have the values given in the respective columns of the table, and the shades of dyeings obtained from the said dyestuffs are given in the last column of the table.

The said dyestuffs may be obtained by methods similar to those described in Examples 1 to 3 by diazotising the appropriate amines of the formula A—NH$_2$ and coupling the resulting diazo compounds with the appropriate coupling components of the formula

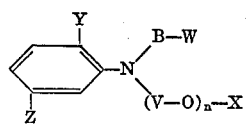

| Example | A | Z | Y | B | W | X | V | n | Shade |
|---|---|---|---|---|---|---|---|---|---|
| 50 | 2-chloro-4-nitrophenol | H | H | —C₂H₄— | —CN | —COCH₃ | —C₂H₄— | 4 | Scarlet. |
| 51 | do | H | H | —C₂H₄— | —CN | —COCH₃ | —C₂H₄— | 6 | Do. |
| 52 | do | H | H | —C₂H₄— | —CN | —COCH₃ | —C₂H₄— | 10 | Bluish-red. |
| 53 | 2-cyano-4-nitrophenyl | H | H | —C₂H₄— | —CN | —CO.OCH₃ | —C₂H₄— | 3 | Rubine. |
| 54 | do | —CH₃ | H | —C₂H₄— | —CN | —COCH₃ | —C₂H₄— | 3 | Red. |
| 55 | do | —Cl | H | —C₂H₄— | —CN | —COCH₃ | —C₂H₄— | 2 | Bluish-red. |
| 56 | 2-chloro-4-nitrophenyl | H | —CH₃ | —C₂H₄— | —CN | —COCH₃ | —C₂H₄— | 2 | Scarlet. |
| 57 | do | —CH₃ | —C₂H₅ | —C₂H₄— | —CN | —COCH₃ | —C₂H₄— | 2 | Red. |
| 58 | do | —NHCOCH₃ | —Cl | —C₂H₄— | —CN | —COCH₃ | —C₂H₄— | 3 | Reddish-violet. |
| 59 | 2-cyano-4-nitro-6-bromophenyl | H | H | —C₂H₄— | —COOCH₃ | —COCH₃ | —C₂H₄— | 2 | Bluish-red. |
| 60 | 2-cyano-4-nitro-phenyl | H | H | —C₂H₄— | —COOC₂H₄OCOCH₃ | —COC₂H₄OCOCH₃ | —C₂H₄— | 3 | Rubine. |
| 61 | 2-chloro-4-nitrophenyl | —CH₃ | H | —CH₂— | —CN | —COCH₃ | —C₂H₄— | 2 | Scarlet. |
| 62 | do | —NHCHO | H | —C₂H₄— | —COOCH₃ | —COCH₃ | —C₂H₄— | 2 | Bluish-red. |
| 63 | do | —NHCOCH₃ | H | —C₂H₄— | —COOCH₃ | —COCH₃ | —C₂H₄— | 2 | Do. |
| 64 | do | —NHCOCH(CH₃)₂ | H | —C₂H₄— | —COOCH₃ | —COCH₃ | —C₂H₄— | 2 | Do. |
| 65 | do | —NHSO₂CH₃ | H | —C₂H₄— | —COOCH₃ | —COCH₃ | —C₂H₄— | 2 | Do. |
| 66 | do | —NHSO₂—⟨C₆H₄⟩—CH₃ | H | —C₂H₄— | —COOCH₃ | —COCH₃ | —C₂H₄— | 2 | Red. |
| 67 | do | —NHCO—⟨C₆H₅⟩ | H | —C₂H₄— | —COOCH₃ | —COCH₃ | —C₂H₄— | 2 | Do. |
| 68 | do | —NHCO—⟨C₆H₄⟩—OCH₃ | H | —C₂H₄— | —COOCH₃ | —COCH₃ | —C₂H₄— | 2 | Bluish-red. |
| 69 | do | —NHCO—⟨C₆H₄⟩—OCH₃ | H | —C₂H₄— | —COOCH₃ | —COCH₃ | —C₂H₄— | 2 | Do. |
| 70 | 2-cyano-4-nitrophenyl | —NHCOOCH₃ | H | —C₂H₄— | —COOCH₃ | —COCH₃ | —C₂H₄— | 2 | Bluish-violet. |
| 71 | do | —NHCONH₂ | H | —C₂H₄— | —COOCH₃ | —COCH₃ | —C₂H₄— | 2 | Do. |
| 72 | do | —NHCOCH₂OCH₂OCH₃ | H | —C₂H₄— | —COOCH₃ | —COCH₃ | —C₂H₄— | 2 | Do. |
| 73 | do | —NHCOCH₂Cl | H | —C₂H₄— | —COOCH₃ | —COCH₃ | —C₂H₄— | 2 | Do. |
| 74 | 2:4-dinitro-6-bromophenyl | —NHCOCH₃ | —OCH₃ | —C₂H₄— | —COOCH₃ | —COCH₃ | —C₂H₄— | 2 | Greenish navy-blue. |
| 75 | do | —NHCOCH₃ | —OC₂H₅ | —C₂H₄— | —COOCH₃ | —COCH₃ | —C₂H₄— | 2 | Do. |
| 76 | do | —CH₃ | —OCH₃ | —C₂H₄— | —COOCH₃ | —COCH₃ | —C₂H₄— | 2 | Bluish-violet. |
| 77 | 2:4-dinitro-6-chlorophenyl | —NHCOCH₃ | —OCH₃ | —C₂H₄— | —COOCH₃ | —COCH₃ | —C₂H₄— | 2 | Greenish navy blue. |
| 78 | 2-cyano-4-nitro-6-bromophenyl | —NHCOCH₃ | —OCH₃ | —C₂H₄— | —COOCH₃ | —COCH₃ | —C₂H₄— | 2 | Reddish navy blue. |
| 79 | 2-cyano-4-nitro-6-bromophenyl | —NHCOCH₃ | —OCH₃ | —C₂H₄— | —COOCH₃ | —COCH₃ | —C₂H₄— | 2 | Greenish-blue. |
| 80 | 2-cyano-4-nitro-6-(methoxycarbonyl)-phenyl | —NHCOCH₃ | —OCH₃ | —C₂H₄— | —OC₂H₄OCOCH₃ | —COCH₃ | —C₂H₄— | 2 | Greenish-blue. |
| 81 | 2:4-dinitro-6-cyanophenyl | —NHCOCH₃ | —OCH₃ | —C₂H₄— | —OC₂H₄OCOCH₃ | —COCH₃ | —C₂H₄— | 2 | Bluish-green. |
| 82 | 2-cyano-4-nitrophenyl | H | H | —C₂H₄— | —OC₂H₄OCOCH₃ | —COCH₃ | —C₂H₄— | 2 | Red. |
| 83 | 2-cyano-4-nitrophenyl | —CH₃ | H | —C₂H₄— | —OC₂H₄OCOCH₃ | —COCH₃ | —C₂H₄— | 2 | Reddish-violet. |
| 84 | 2-chloro-4-nitrophenyl | H | H | —C₂H₄— | —OC₂H₄OCOCH₃ | —COCH₃ | —C₂H₄— | 2 | Reddish-blue. |
| 85 | 2-chloro-4-nitro-6-bromophenyl | —CH₃ | —OCH₃ | —C₂H₄— | —COOCH₃ | H | —C₂H₄— | 2 | Reddish-blue. |
| 86 | 6-bromo-2:4-dinitroaniline | —NHCOCH₃ | —OCH₃ | —C₂H₄— | —COOCH₃ | —COCH₃ | —C₂H₄— | 2 | Greenish navy blue. |

The 3 - {N-(β-cyanoethyl)-N-[β-(β'-hydroxyethoxy) ethyl]-amino}acetanilide used in the above examples was obtained by reacting 3-[N-(β-cyanoethyl)amino]acetonilide with two molecular proportions of ethylene oxide at 7° C. The resulting product distilled at 260° to 270° C. at a pressure of 0.2 mm. of mercury.

The N - (β-cyanoethyl)-N-{β-[γ'-(β''-acetoxyethoxy) propoxy]-ethyl}aniline used in the above examples was obtained by condensing α:γ-dichloropropane with two molecular proportions of the sodium salt of ethylene glycol, converting the β-[γ'-(β''-hydroxyethoxy)-propoxy]ethanol to the dichloro compound, treating with sodium acetate to convert one of the chlorine atoms to an acetoxy group, and subsequently condensing with N-β-cyanoethylaniline.

The N - (β-cyanoethyl)-N-[(β-acetoxyethoxy)methyl] aniline used in the above examples was obtained by reacting β-(chloromethoxy)ethanol with acetic anhydride and subsequently condensing with N-(β-cyanoethyl)aniline.

The coupling components used in Examples 50, 51 and 52 were obtained by condensing N-(β-cyanoethyl)aniline with 4, 6 and 10 molecular proportions respectively of ethylene oxide, and acetylating the resulting products using products using acetic anhydride.

What we claim is:
1. The water-insoluble azo dyestuffs which are free from carboxylic acid and sulphonic acid groups and which are represented by the formula

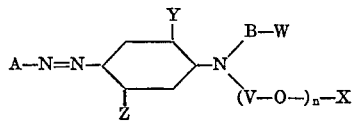

wherein
A represents a member selected from the class consisting of phenyl and phenyl substituted with a member selected from the class consisting of chlorine, bromine, nitro, cyano, trifluoromethyl, methyl, methoxy, lower alkyl sulphonyl, lower alkyl carbonyl, carbo lower alkoxy, a single phenylazo group and sulphamyl;
Y is selected from the class consisting of hydrogen, chlorine, lower alkyl and lower alkoxy;
Z is selected from the class consisting of hydrogen, chlorine, bromine, trifluoromethyl, lower alkyl, lower alkoxy and —NHCOR wherein R is selected from the group consisting of hydrogen and lower alkyl;
B is a lower alkylene radical;
W is selected from the class consisting of cyano, phenoxy, tolyloxy, carbo lower alkoxy, phenoxycarbonyl, tolyloxycarbonyl and the radical —O—COX' wherein X' is selected is selected from the group consisting of hydrogen and lower alkyl and B and W together form the group —(V—O—)ₙ—T—R² wherein T is selected from the class consisting of —CO—, —SO₂—,

and —CONH— and R² is selected from the class consisting of lower alkyl, phenyl and tolyl;
V is a lower alkylene radical;
n is an integer of from 2 to 10; and
X is selected from the class consisting of hydrogen and —T—R² wherein T and R² have the meanings given above.

2. The water-insoluble azo dyestuffs which are free from carboxylic and sulphonic acid groups and which are represented by the formula

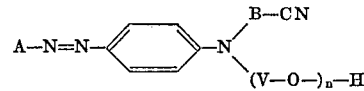

wherein
A represents a member selected from the class consisting of phenyl and phenyl substituted with a member selected from the class consisting of chlorine, bromine, nitro, cyano, trifluoromethyl, methyl, methoxy, lower alkyl sulphonyl, lower alkyl carbonyl, carbo lower alkoxy, a single phenylazo group and sulphamyl;
B and V each independently represent lower alkylene radicals; and
n is an integer from 2–10.

3. The water-insoluble azo dyestuffs which are free from carboxylic acid and sulphonic acid groups and which are represented by the formula

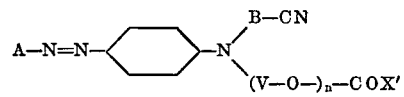

wherein
A represents a member selected from the class consisting of phenyl and phenyl substituted with a member selected from the class consisting of chlorine, bromine, nitro, cyano, trifluoromethyl, methyl, methoxy, lower alkyl sulphonyl, lower alkyl carbonyl, carbo lower alkoxy, a single phenylazo group and sulphamyl;
B and V each independently represent lower alkylene radicals;
X' is lower alkyl; and
n is an integer from 2–10.

References Cited

UNITED STATES PATENTS 2,266,142  12/1941  Adams _____ 260—205
2,359,305  10/1944  Dickey et al. _____ 260—205

CHARLES B. PARKER, *Primary Examiner.*

DONALD M. PAPUGA, *Assistant Examiner.*

U.S. Cl. X.R.

8—41, 55; 260—37, 186, 187, 206, 207, 207.1, 107.5, 465, 546